United States Patent [19]
Ruhland

[11] Patent Number: 5,770,063
[45] Date of Patent: Jun. 23, 1998

[54] PLATE-RETAINING ASSEMBLY FOR FILTER PRESS

[75] Inventor: Heinz Ruhland, Gieslingen, Germany

[73] Assignee: Lenser Kunststoff-Presswerk GmbH & Co. KG, Senden, Germany

[21] Appl. No.: 782,767

[22] Filed: Jan. 13, 1997

[30] Foreign Application Priority Data

Jan. 27, 1996 [DE] Germany .................. 196 02 977.5

[51] Int. Cl.$^6$ .................................. B01D 25/133
[52] U.S. Cl. ..................... 210/228; 210/229; 210/231; 100/197; 100/211
[58] Field of Search .................................. 210/224, 227, 210/228, 229, 231, 350, 351; 100/211, 197

[56] References Cited

U.S. PATENT DOCUMENTS

| | | | |
|---|---|---|---|
| 4,608,164 | 8/1986 | Neu | 210/231 |
| 5,484,526 | 1/1996 | Bonn | 210/229 |
| 5,601,709 | 2/1997 | Ruhland | 210/226 |

FOREIGN PATENT DOCUMENTS 2107599  5/1983  United Kingdom ............. 210/231

*Primary Examiner*—Matthew O. Savage
*Attorney, Agent, or Firm*—Herbert Dubno; Andrew Wilford

[57] ABSTRACT

A filter-plate assembly has a support plate having an outwardly directed face and formed with an annular groove opening outward at the face and a chamber plate confronting the face of the support plate, forming therewith an inlet compartment, and formed with an inlet-port cutout opening into the compartment. A flexible filter plate adjacent the support plate has an outer peripheral frame set in the groove and a generally planar central panel within the frame and having a back face turned toward and forming a compartment with the face of the support plate and a front face turned away from the support plate and adapted to be overlain by a filter cloth. A rigid retaining bar overlying the frame extends parallel to it at the cutout. Bolts or the like secure the retaining bar relative to the support plate against the frame to hold the frame tightly in place in the groove of the support plate at the cutout.

8 Claims, 3 Drawing Sheets

PLATE-RETAINING ASSEMBLY FOR FILTER PRESS

FIELD OF THE INVENTION

The present invention relates to a filter press. More particularly this invention concerns a retaining assembly for a filter plate of such a press.

BACKGROUND OF THE INVENTION

A standard filter press has a plurality of compartments defined between filter plates and each subdivided by a filter cloth or screen into an input compartment and an output compartment. The filter plates have ridged and grooved front surfaces turned toward the filter cloth and forming drainage channels in the respective output compartments. The filtrate is introduced into the input compartment and the liquid phase is extracted along the channels from the output compartment, with the solid phase of the suspension left on the filter cloth.

As described in commonly owned U.S. Pat. No. 4,997,560, in order to clean such a filter the center panels of the filter plates are constituted as membranes that are sufficiently elastic or resilient that the plates of each compartment can be pushed forward to press the solid phase on the two filter cloth into a filter cake that can be back flushed or otherwise emptied from the machine. This forward deflection to compress the solid phase is effected by pneumatically or hydraulically pressurizing another compartment formed between the back face of the plate and a relatively rigid backing plate located immediately behind each filter plate. The backing plates are alternated with chamber plates against which the membranes press the filter cake.

PCT patent application PCT/EP91/01584 based on German 4,118,620 filed 6 Jun. 1991 by H. Bonn describes such a system where each membrane plate has a thickened outer edge or frame that sits in a groove of the rigid backing or support plate. An annular clip sits on each frame to retain it in place in the groove. This clip is a complex two-part item that must be perfectly set in order for the filter to function, in particular because the drain passages in part pass through the clip.

In my earlier U.S. Pat. application No. 08/448,321 filed 23 May 1995 now U.S. Pat. No. 5,601,709 issued 11 Feb. 1997 I describe a filter-plate assembly having a backing wall having an outwardly directed face and formed with an annular groove opening outward at the face and of a predetermined transverse width and a filter plate adjacent the wall and having an outer peripheral frame set in the groove and of a width substantially less than the width of the groove so as to define therewith an outwardly open annular gap. A generally planar central panel within the frame has a back face turned toward and forming a compartment with the wall and a front face turned away from the wall and adapted to be overlain by a filter cloth. A retaining bar is set in the space and braced transversely between the frame of the element and the backing wall.

Thus this simple retaining bar, which is a tight fit in a direction transverse to the direction the frame will have to move to leave the groove, effectively holds the frame in place. Since the frame is a loose fit in the groove, it is a very simple task to fit the plate to the rigid backing wall, unlike the prior art where the frame was a very tight fit and, hence, very difficult to fit in place. Once the at least partially elastomeric frame is in place, it is a simple matter to force in the retaining bar which is of much more rigid material.

The inlet compartment is typically supplied a suspension to be filtered through an inlet port that extends out at a corner of the filter-plate assembly. This inlet port typically runs at a corner of the chamber plate so that in this region the frame is not actually compressed by the chamber plate into the groove in the backing plate. As a result leakage is possible at this location.

OBJECTS OF THE INVENTION

It is therefore an object of the present invention to provide an improved retaining assembly for a plate of a filter press.

Another object is the provision of such an improved retaining assembly for a plate of a filter press which overcomes the above-given disadvantages, that is which ensures a tight seal between the filter plate and the backing plate even in the region of the inlet port.

SUMMARY OF THE INVENTION

A filter-plate assembly has according to the invention a support plate having an outwardly directed face and formed with an annular groove opening outward at the face and a chamber plate confronting the face of the support plate, forming therewith an inlet compartment, and formed with an inlet-port cutout opening into the compartment. A flexible filter plate adjacent the support plate has an outer peripheral frame set in the groove and a generally planar central panel within the frame and having a back face turned toward and forming a compartment with the face of the support plate and a front face turned away from the support plate and adapted to be overlain by a filter cloth. A rigid retaining bar overlying the frame extends parallel to it at the cutout. Bolts or the like secure the retaining bar relative to the support plate against the frame to hold the frame tightly in place in the groove of the support plate at the cutout.

Thus with this system the filter plate is solidly held in place at the critical location where the cutout is formed. Even when the compartment between the support plate and the filter plate is pressurized to compact the filter plate on the filter cloth, the filter plate will remain solidly anchored in the support plate.

According to the invention the support plate and filter-plate frame together form at the cutout an outwardly open recess complementary to the retaining bar. The bar is recessed in the plates so it lies flush therewith.

The cutout has a predetermined width and the bar has a length greater than the width so that the bar extends past the cutout. Furthermore the bar is of generally rectangular section and the support plate has two such faces directed in opposite directions and each formed with a respective such annular groove receiving a respective frame of a respective filter plate with a respective retaining bar engaged over each frame. The securing means extends from the bar on one face of the support plate to the bar on the other face of the support plate. More particularly, the securing means is a plurality of bolts having heads bearing against one of the bars and a shank threaded into the other of the bars. The bar is made of stainless steel, plastic, rubber-covered metal, or reinforced plastic.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
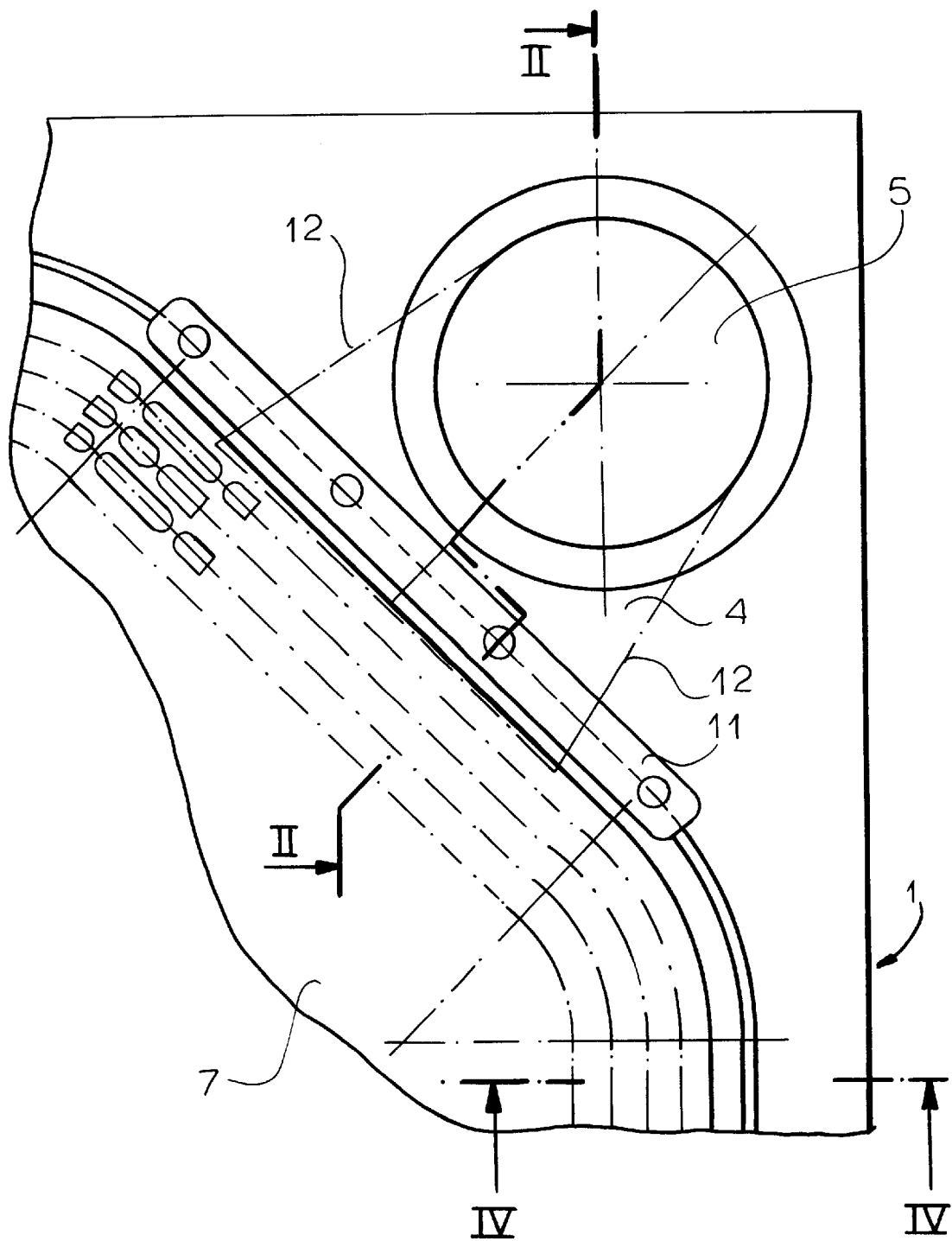
FIG. 1 is a partly diagrammatic end view of a corner of a filter-plate assembly according to the invention.
Figure 2:
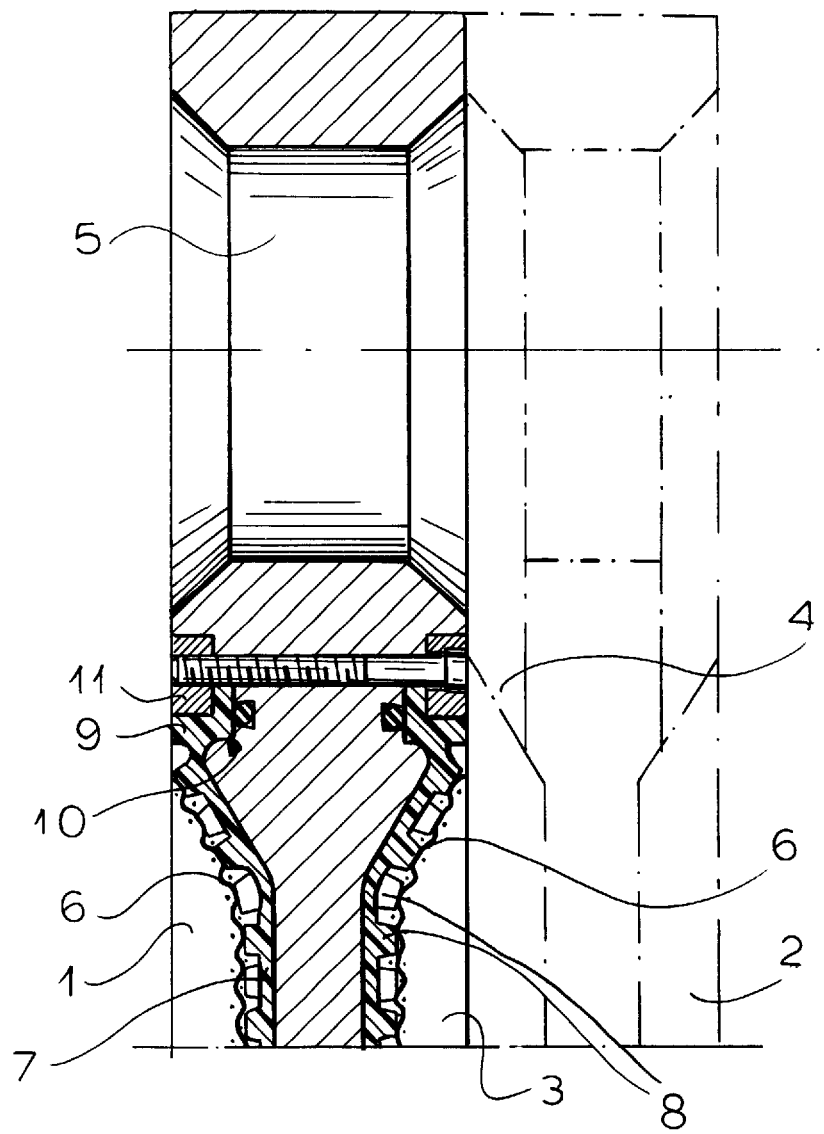
FIG. 2 is a section taken along line II—II of FIG. 1.
Figure 4:
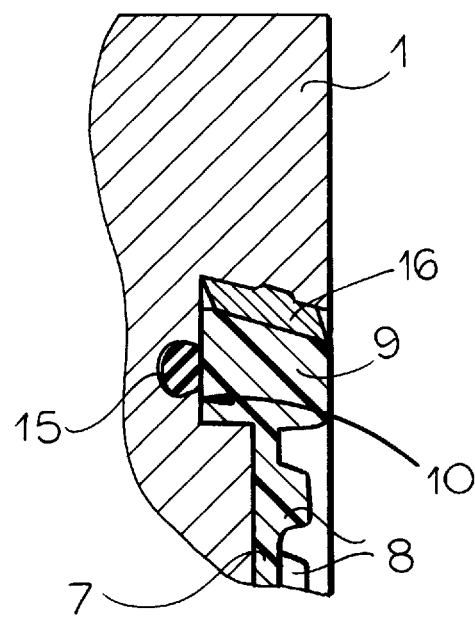
FIG. 4 is a section taken along line IV—IV of FIG. 1.
Figure 3:
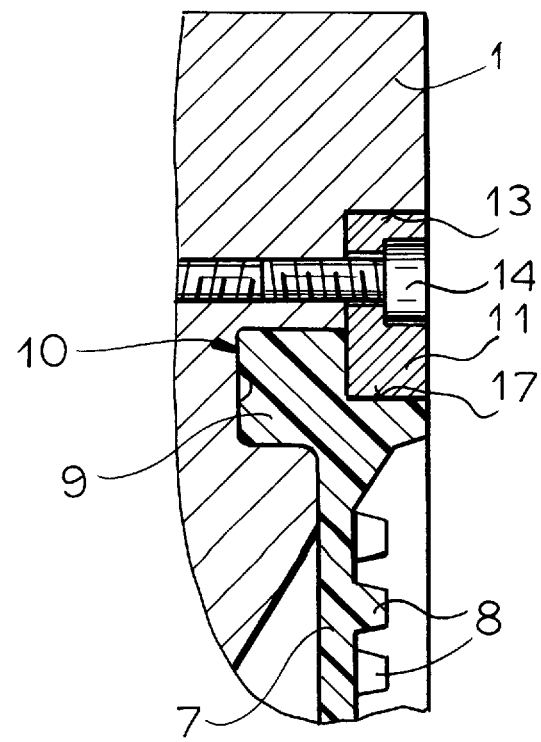
FIG. 3 is a large-scale view of a detail of FIG. 2.

As seen in FIGS. 1 through 4 a filter press according to the invention comprises backing plates 1 and chamber plates 2 together defining an inlet compartment to which a suspension to be filtered is fed via a corner inlet port 4 cut into the plate 2 and itself supplied from a corner feed passage 5. A synthetic-resin and fairly flexible filter plate 7 overlies a face of the backing late 1 and in turn is overlain by a filter mesh or cloth 6. The plate 7 has an outer face formed with bumps 8 that hold off the cloth 6 and form a space that is connected to an unillustrated outlet port connected in turn to the intake of a pump. Thus the suspension to be filtered is introduced into the inlet compartment 3 via the passage 5 and port 4 so that the liquid phase passes through the cloth 6 while the solid phase remains on the surface of the cloth 6, the filtrate being sucked out from between the cloth 6 and the outer or front face of the membrane 7. A back face of the plate 7 normally lies against the backing plate 1 but the space between the filter plate 7 and backing plate 1 can be filled with a fluid to push out the filter plate 7 and compress the solid phase thereon into a filter cake that can be back-flushed or otherwise removed from the system.

According to the invention the filter plate 7 has a thickened outer peripheral rim or frame 9 that is set in a groove 10 of the backing plate 1, bearing against a seal 15 and secured in place by retaining strips 16 as described in the above-cited copending U.S. patent application. In addition at the corner of the inlet port 4 the plate 1 is formed with another groove 13 and the frame 9 is also cut out at 17 to accommodate a stiff rectangular section retaining bar 11 secured in place by screws 14 that extend through the plate 1 where they are threaded into the bar 11 on the opposite face of the plate 1. This bar extends past edges 12 of the port 4 so that the frame 9 is solidly retained in this region, where the plate 2 is not bearing against it.

I claim:

1. A filter-plate assembly comprising:

a support plate having an outwardly directed face and formed with an annular groove opening outward at the face;

a chamber plate having a face confronting the face of the support plate, forming therewith an inlet compartment, and formed with an inlet-port cutout groove crossing over the annular groove and opening into the compartment and toward the support plate;

a flexible filter plate adjacent the support plate and having an outer peripheral frame set in the annular groove and having a portion extending across the cutout groove, and a generally planar and imperforate central panel surrounded by the outer peripheral frame and having a back face turned toward and forming a compartment with the support plate and a front face turned away from the support plate and adapted to be overlain by a filter cloth;

a rigid retaining bar overlying the frame portion, extending across the cutout groove, holding the frame portion in the annular groove at the cutout groove, and extending parallel to the frame portion at the cutout groove; and means securing the retaining bar on the support plate against the frame Portion for holding the frame portion tightly in place in the annular groove of the support plate at the cutout groove.

2. The filter-plate assembly defined in claim 1 wherein the support plate and outer peripheral frame together form at the cutout groove an outwardly open recess complementarily receiving the retaining bar.

3. The filter-plate assembly defined in claim 1 wherein the cutout has a predetermined width and the bar has a length greater than the width, whereby the bar extends past the cutout.

4. The filter-plate assembly defined in claim 1 wherein the bar is of generally rectangular section.

5. The filter-plate assembly defined in claim 1 wherein the support plate has two such faces directed in opposite directions and each formed with a respective such annular groove receiving a respective such frame of a respective such filter plate with a respective such retaining bar engaged over each frame, the securing means extending from the bar on one of the faces of the support plate to the bar on the other of the faces of the support plate.

6. The filter-plate assembly defined in claim 5 wherein the securing means is a plurality of bolts having heads bearing against one of the bars and a shank threaded into the other of the bars.

7. The filter-plate assembly defined in claim 1 wherein the bar is made of stainless steel, plastic, rubber-covered metal, or reinforced plastic.

8. The filter-plate assembly defined in claim 1 wherein the bar is recessed in and flush with the faces of the support plate and filter plate.

* * * * *